(12) United States Patent  
Geffen et al.

(10) Patent No.: US 9,167,093 B2  
(45) Date of Patent: Oct. 20, 2015

(54) SYSTEM AND METHOD FOR REAL-TIME PROCESS MANAGEMENT

(71) Applicant: NICE-SYSTEMS LTD., Ra'anana (IL)

(72) Inventors: David Geffen, Givat Shmuel (IL); Eshay Livne, Karkur (IL)

(73) Assignee: NICE-SYSTEMS LTD., Ra'anana (IL)

( * ) Notice: Subject to any disclaimer, the term of this patent is extended or adjusted under 35 U.S.C. 154(b) by 172 days.

(21) Appl. No.: 13/686,970

(22) Filed: Nov. 28, 2012

(65) Prior Publication Data

US 2014/0146958 A1    May 29, 2014

(51) Int. Cl.  
H04M 3/00    (2006.01)  
H04M 3/51    (2006.01)

(52) U.S. Cl.  
CPC .................................. *H04M 3/5175* (2013.01)

(58) Field of Classification Search  
USPC ........ 379/265.01–265.14, 266.01–266.1, 309  
See application file for complete search history.

(56) References Cited

U.S. PATENT DOCUMENTS

| | | | |
|---|---|---|---|
| 6,882,723 B1* | 4/2005 | Peterson et al. | 379/265.01 |
| 2002/0196277 A1* | 12/2002 | Bushey et al. | 345/745 |
| 2006/0262922 A1* | 11/2006 | Margulies et al. | 379/265.12 |
| 2007/0038499 A1* | 2/2007 | Margulies et al. | 705/9 |
| 2007/0198330 A1* | 8/2007 | Korenblit et al. | 705/11 |
| 2008/0181389 A1* | 7/2008 | Bourne et al. | 379/265.06 |
| 2008/0208644 A1* | 8/2008 | Gray et al. | 705/7 |

OTHER PUBLICATIONS

U.S. Appl. No. 12/485,180, filed Dec. 16, 2010, Geffen et al.  
U.S. Appl. No. 13/037,979, filed Sep. 6, 2012, Portman et al.  
U.S. Appl. No. 13/282,047, Livne et al.  
U.S. Appl. No. 13/340,177, Livne et al.

* cited by examiner

*Primary Examiner* — William Deane, Jr.  
(74) *Attorney, Agent, or Firm* — Pearl Cohen Zedek Latzer Baratz LLP (57) ABSTRACT

A system and method for real-time process management. An attribute of a process currently performed may be related to a key performance indicator (KPI) threshold. A system may determine, in real-time, the KPI threshold was breached. An indication may be provided to, for example, a mobile device. Feedback related to an intervention of an expert may be received on the mobile device.

20 Claims, 4 Drawing Sheets

SYSTEM AND METHOD FOR REAL-TIME PROCESS MANAGEMENT

BACKGROUND OF THE INVENTION

A contact center (e.g., a center accepting telephone calls and other communications on behalf of an organization) may employ a large number of customer service representatives (CSR), customer service advisors (CSA) or similar personnel generally referred to herein as agents. Agents interact with customers to provide services, e.g., providing answers to customers' inquiries, performing transactions, selling products or services and the like.

Agents in a modern contact center may be required to provide information, complete transactions and otherwise perform tasks related to a large number of services and products as well as be able to operate a large number, at times complicated, computer applications. Typically, agents are further required to perform these tasks in real-time, e.g., while talking or otherwise interacting with a client or a potential customer.

To assist agents, supervisors and/or experts (S&E) are employed. An expert or supervisor typically has extended knowledge, skills, expertise and/or privileges related to services provided by the contact center and/or applications or systems that need to be operated. Typically, upon encountering a problem or difficulty, an agent may call or alert an expert for assistance. In other cases, a supervisor may monitor, or even join, a session or interaction between an agent and a customer in order to help an agent, monitor or evaluate performance of an agent or perform other tasks related to an operation of the contact center.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those having ordinary skill in the art that the invention may be practiced without these specific details. In other instances, well-known methods, procedures, components, modules, units and/or circuits have not been described in detail so as not to obscure the invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time or overlapping points in time. As known in the art, an execution of an executable code segment such as a function, task, sub-task or program may be referred to as execution of the function, program or other component.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Figure 1:
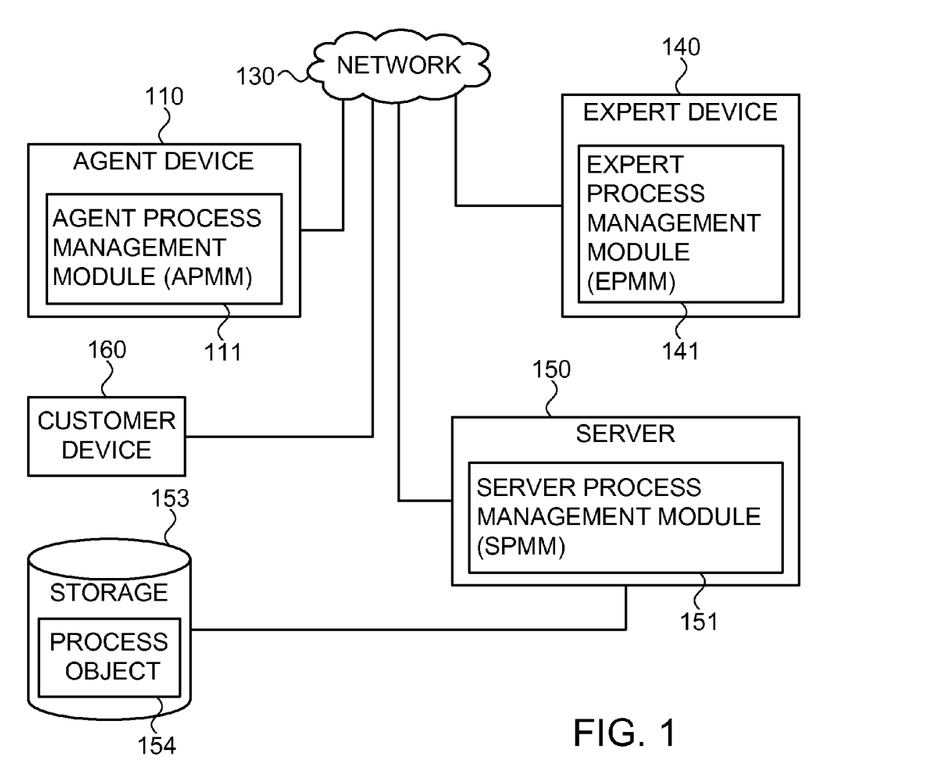
FIG. 1 shows an exemplary system according to embodiments of the invention.

Reference is made to FIG. 1 that shows an exemplary system setup according to embodiments of the invention. As shown, a setup may include agent device 110 (typically used by a human agent) which may include or be operatively connected to agent process management modules (APMM) 111. As further shown, a setup may include an expert device 140 (also referred to herein as iXpert device), typically used by a human expert, that may include or be operatively connected to an expert process management module (EPMM) 141. As further shown, a setup may include a customer device 160. A setup may include a server 150 that may include or be operatively connected to a server process management module (SPMM) 151. As shown, server 150 may be operatively connected to storage 153 that may include a process object 154. A setup may include network 130 that may enable agent device 110, customer device 160, expert device 140 and server 150 to communicate.

For the sake of clarity and simplicity, only some of the components and/or devices in a possible system or setup are shown. For example, in a typical contact center employing a large number of agents (e.g., people communicating with users or customers) or service representatives, a large number of devices such as, or similar to, agent device 110 may be included. Likewise, a large number of expert devices such as, or similar to, expert device 140 may be included in a system. Any number of servers similar to server 150 may be included in a system. For example, a system may be scaled up by adding servers in a contact center. Accordingly, it will be understood that methods and operations described with respect to devices 110 and 140 and/or server 150 may be performed by any one of a large set of similar devices in a system or setup according to embodiments of the invention.

For the sake of simplicity and clarity, a contact center is mainly referred to herein. However, it will be understood that embodiments of the invention are not limited to contact centers and may be realized or applicable in other setups, scenarios or configurations. In one setup, agent device 110, server 150 and expert device 140 and may be located within, or otherwise associated with, a contact center, an enterprise, a department of an organization or any entity designed for interacting with customers, clients or other entities. In another setup or embodiment, although associated with a contact center (or other entity as discussed), agent device 110 and/or expert device 140 may be physically located elsewhere or remotely, e.g., agent device 110 may be located in a home of an agent and server 150 may be located within a contact center. Accordingly, although the discussion herein will mainly relate to agents and experts in a contact center, embodiments of the invention may be realized in other setups or configurations.

Agent device 110 may be any applicable device, used by service representatives in an enterprise or call center, for interacting over a session with a customer. Any relevant communication channel may be supported by agent device 110. For example, an audio channel supporting a telephone call or a data communication channel supporting a web session (e.g., a chat session, a document sharing session or a connection to the internet). Other communication channels supported by device 110 may support a text based session, e.g. a short message service (SMS) session or an electronic mail (e-mail) session.

For example, agent device 110 may be a computing device, a telephone or smartphone or a combination thereof. In an embodiment, agent device 110 may be a desktop or laptop computer that may enable both communicating over a computer network and over a voice or telephony network, e.g., Voice Over IP using VoIP (VoIP). Accordingly, agent device 110 may enable communicating with customer device 160, server 150 and expert device 140 over a number of communication channels or sessions.

Expert device 140 may be any computing and/or communication device. Typically an expert device 140 enables an expert to roam or be otherwise mobile while maintaining a communication link, but in other embodiments expert devices need not be mobile. Expert device 140 may support both voice and data channels. For example, expert device 140 may be a tablet computer that may enable an expert to participate in a voice session (e.g., a telephone or conference call). Expert device 140 may enable an expert to send and receive digital information or data over a computer network. Expert device 140 may further be configured to process and present digital information, e.g., using a controller, a memory and input and output components such as a display, a keyboard, a stylus, a mouse and/or speakers.

For example, expert device 140 may be a commercial business tablet device such as Apple iPad device, Cisco Cius device, Google Chrome OS tablet device, Dell Streak device, Samsung Galaxy Tab device, RIM PlayBook device and/or HP PalmPad device. Accordingly, expert device 140 may be any device having suitable computational and presentational capabilities and further capable of providing connectivity and mobility. For example, expert device 140 may a device supporting communication platforms, protocols or technologies such as a wireless local area network operating according to the IEEE 802.11 standards family (e.g., Wi-Fi), International Mobile Telecommunications-2000 (IMT-2000), also known as 3G or '3rd Generation' family of standards for mobile telecommunications and/or Global System for Mobile Communications (GSM). Customer device 160 may be a wireless or mobile telephone, a smartphone, a computer or any device that may be used by a customer to call (e.g., conduct a telephone call), or interact with, an agent or a contact center or interact with a remote computing or communication device. Customer device 160 need not be mobile. Generally, computing devices 110, 140 and 160 may be or may include any computing device capable of supporting at least data and voice communication, e.g., a computer, a wireless phone, or any other applicable computing device. For example, devices 110, 140, 160 and server 150 may be similar to respective devices or embodiments described in U.S. patent application Ser. No. 13/282,047 filed on Oct. 26, 2011 and entitled "APPLICATION USAGE AND PROCESS MONITORING IN AN ENTERPRISE ENVIRONMENT" hereby incorporated by reference in its entirety. Devices 110, 140, 160 and server 150 may be similar to or have components shown in FIG. 5. Devices and systems as described herein may have other configurations and other sets of components.

Network 130 may be, may comprise or may be part of a private or public internet protocol (IP) network, or the internet, or a combination thereof. Additionally or alternatively, network 130 may be, may comprise or may be part of a global system for mobile communications (GSM) network. For example, network 130 may include or comprise an IP network such as the internet, a GSM related network and any equipment for bridging or otherwise connecting such networks as known in the art. In addition, network 130 may be, may comprise or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, a satellite communication network, a cellular communication network, any combination of the preceding and/or any other suitable communication means. Accordingly, numerous elements of network 130 are implied but not shown, e.g., access points, base stations, communication satellites, GPS satellites, routers, telephone switches, etc. It will be recognized that embodiments of the invention are not limited by the nature of network 130.

A portion of network 130 may be internal to a contact center and another portion of network 130 may be external to a contact center. For the sake of simplicity, such possible portions are not shown, however, it will be understood that network 130 may be configured to enable any configuration or setup required. For example, secured communication (e.g., confined to a contact center) between an agent and an expert using devices 110, 120 and 140 may be enabled by network 130. Communication between an agent, an expert and a customer over a public or global network may be enabled by a public or global network portion included in network 130. Suitable network devices such as switches, routers and firewalls may be included in network 130 to enable any required configuration, e.g., a separation of an internal and external networks or enabling devices that use wireless communication to communicate with devices using wired networks.

Server 150 may be any suitable server or computing device or system or it may be a number of computing devices. Storage 153 may be any suitable storage device or system. Storage 153 may be or may include a database and a database application. For example, Storage 153 may include or may be, a hard disk drive, an array of hard disks, a Compact Disk (CD) drive or other suitable removable and/or fixed storage units, or it may include or may be a USB storage device or a network storage device or system.

Figure 5:
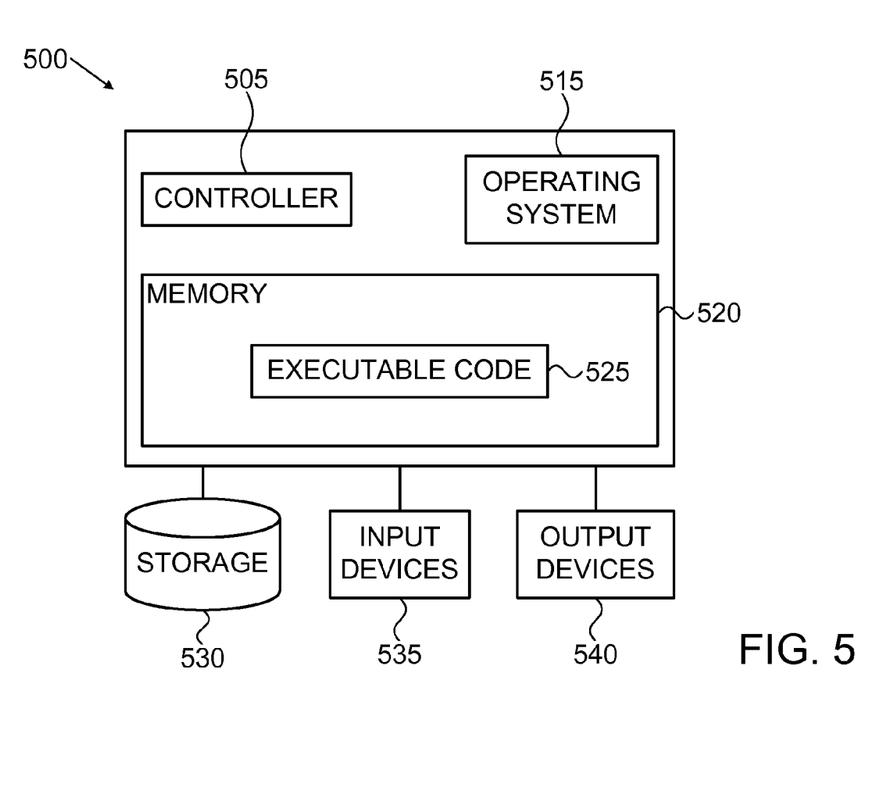
FIG. 5 shows high level block diagram of an exemplary computing device according to embodiments of the present invention.

Agent process management module APMM 111, expert process management module EPMM 141 and server process management module SPMM 151 may be or may include specific hardware modules, e.g., provided as cards that may be installed on a computing device. In other embodiments, some of modules APMM 111, EPMM 141 and SPMM 151 may be an application, e.g., an executable code segment or a set of instructions designed to cause a computing device to perform methods described herein. For example, EPMM 141 may be an application installed on a tablet or other wireless computing device. In some embodiments, modules APMM 111, EPMM 141 and SPMM 151 may be or may include hardware, firmware, software or any combination thereof. Modules APMM 111, EPMM 141 and SPMM 151 may be executed by a processor such as controller 505 (FIG. 5).

Modules APMM 111, EPMM 141 and SPMM 151 may be configured to interact with hardware and/or software in an associated device. For example, APMM 111 may interact with an application or a hardware component on agent device 110 to receive any information or data related to an action, interaction or operation of agent device 110, e.g., any information or data related to an interaction of an agent (not shown) with device 110.

In some embodiments, Modules APMM 111, EPMM 141 and SPMM 151 may be similar to embodiments described in U.S. patent application Ser. No. 13/282,047. Of course, devices and systems as described herein may have other configurations and other sets of components. For example, APMM 111 may be similar to, or include components included in, to the process monitor described in the '047 U.S. Patent Application.

A process as referred to herein may be represented by (or defined in) a process object. A process object may be stored and communicated using any applicable construct or form. For example, one or more process objects may be included in a file. For example, process object 154 may be a file that may include definitions of one or more processes. A process as referred to herein may be, may include, or may be associated with, one or more tasks. For example, handling a service request may be a process that may include, or be associated with, tasks such as, open form, fill in form details, assign a technical support resource and terminate process. Tasks may have sub-tasks, for example, the open form task may include sub-tasks such as open a customer relationship management (CRM) applications, fill a customer details form and fill a service request form. It will be understood that any operations or methods related to tasks described herein may be applicable to subtasks.

A process as referred to herein may include, or be associated with, process data. Process data may include any information related to properties, attributes, dimensions, characteristics or any other aspects of a process. For example, process data may include process global information, e.g., a process name, a process identification parameter, a total time required for completing the process etc. Process data may include task specific information.

For example, task specific information included in process data may be a time required for completing a specific task included in a process. For example, a process definition in a process object may include an identification parameter for each task (or sub-task) included in (or associated with) the process. For example, tasks performed in a call center (e.g., open form, fill in form) may be identified and may be associated with an identification code or parameter. Accordingly, associating or linking a task with a process may be achieved by including the task's identification code in a process object.

Although tasks performed by agents or CSRs are mainly discussed herein, other configurations are possible. For example, tasks performed by a system may be associated with a process. For example, a database query may be a task included in a process. Accordingly, at least relating a process currently performed to a threshold such as a KPI or other performance threshold and determining, possibly in real-time, whether or not the KPI threshold was breached or violated may be based on tasks performed by an application. A progress, status or state of a process may be based on a progress, status or state of an application or system. For example, if a process includes calling a client then the time and/or resources needed for establishing the call may be measured or otherwise monitored and a breaching of a KPI may be determined based on a progress, status or state of a system used in order to place the call or establish a session.

Additional information related to a task may be included in a process definition, e.g., in a process object. For example, each task included in a process may be associated with one or more parameters or data objects. For example, information related to task duration, skills or resources required in order to complete the task and the like may be included in process data. Other information may include tasks interdependencies. For example, process data may include a sequence according to which tasks in a process are performed. Process data may indicate a number of tasks in a process that should not be executed or performed simultaneously, or indicate two or more tasks in a process which may not be executed at the same time.

A process object (e.g., process object 154), may be any construct or object (e.g., a file including a dynamic-link library (DLL)) that includes a process definition for example as described herein. It will be understood that a process object may be divided into a number of objects, however, for the sake of clarity, a single object for storing a definition of a process is shown and discussed herein. In some embodiments, a process and a process object may be similar to, or may include components included in, a process and a process object as described in U.S. patent application Ser. No. 13/340,177 filed on Dec. 29, 2011 and entitled "APPLICATION USAGE AND PROCESS MONITORING IN AN ENTERPRISE ENVIRONMENT HAVING AGENT SESSION RECORDING PROCESS DEFINITION" hereby incorporated by reference in its entirety. Of course, devices and systems as described herein may have other configurations and other sets of components. Additional objects or methods that may be used with the present invention are disclosed in copending U.S. patent application Ser. No. 13/037,979, filed Mar. 1, 2011 and entitled "SYSTEM AND METHOD FOR ASSISTING AN AGENT IN A CONTACT CENTER", the entire disclosure of which is hereby incorporated by reference.

Accordingly, a process definition, process data, or other information in a process object may be used to identify, possibly in real-time, a process currently performed by a CSR. For example, APMM 111 may collect information related to an activity (or lack thereof) of a CSR (e.g., by monitoring a device operated by the CSR and/or by tracking applications executed by the CSR as described in the patent applications mentioned herein) and may identify a process currently performed by the CSR by relating collected information with information in the process object. For example, if a sequence of tasks or operations performed by a CSR matches a sequence in process data, then the process performed by the CSR may be identified.

When used herein, real-time may mean very quickly, or within a short duration, for example within five seconds, so that the processes relevant to or affected by a determination or calculation can have the results of the real-time identification or determination during the process, or very soon after the events which cause the determination to be made. For example, real-time may mean that within a few seconds of the breaching of a threshold, an alarm or notification is sent.

A process may be associated with one or more performance indicators (PIs) or key performance indicator (KPIs).

Generally, a KPI may include one or more thresholds and related criteria or rules. Complex rules in a KPI enable monitoring properties of a process. An alarm or other notification may be triggered based on a KPI, e.g., when a threshold such as a KPI threshold is breached. A process object may include a process definition, process data and one or more KPIs related to the process.

Accordingly, a process object that includes a KPI may be used to determine, typically in real-time, whether or not a threshold such as a KPI threshold was breached or exceeded by at least one characteristic or property of a process currently performed or executed. A property of a process may be, for example, a time required to complete the process, a skill required etc. In some cases a property or KPI threshold is not a numerical value; e.g., a user lacks a skill required, there is a mismatch in requirements, a breach or violation may simply mean that the process or the user performing this process does not have the required property, e.g., the user lacks a required skill. For example, process data and definition, and a KPI may be compiled into a dll file and provided to APMM 111 that may use the dll to compare a property of a process currently performed by a CSR to a KPI threshold (e.g., a time spent on the process may be compared to a time threshold defined by a KPI) and determine, in real-time, whether or not the KPI threshold was breached or violated. Other properties of a process, e.g., a customer identification or type, a CSR identification or a service identification may be similarly used. Complex KPIs may be defined and used. For example, a KPI may define, for the same task in a process, or for an entire process, a first time threshold for a platinum customer, and a second time threshold for a regular customer.

A process object usable to monitor a process as described herein may be selectively provided. For example, a process object may be associated with a set or group of CSRs in a call center. Upon login of a CSR to a contact center network or platform, the CSRs identity may be determined and, if the CSR belongs to the set or group, the process object may be automatically provided to the computing device operated by the CSR. For example, a process object may be provided to agent device 110 only if one of a predefined group of CSRs logs into device 110 or uses device 110 to log into a contact center network.

APMM 111 may use a process object to collect, in real-time, information related to a progress of a process and send the information to a server such as server 150 in real-time. For example, using a process object, a process currently performed by a CSR may be identified. A data set related to the process may be generated based on the process object. For example, process or task identification information may be extracted from a process object and used to generate a data set that may include information related to a progress of the process, e.g., the time spent on the process, resources used etc.

Modules APMM 111, EPMM 141 and SPMM 151 may operate together in order to enable relating or comparing a process currently performed by the CSR to a threshold such as a KPI threshold, determining, possibly in real-time, whether or not the KPI threshold was breached, providing, in real-time, data related to the breached KPI threshold to a computing device or mobile device, and receiving, at the mobile device, feedback or other information related to help or assistance provided to the CSR, e.g., assistance provided in relation to the breached KPI threshold. Any action performed by an expert may be recorded in association with a process, a process object, a CSR, a product or a customer. For example, the time spent by an expert in helping a CSR performing a process may be recorded in association with a process object, in association with the CSR and in association with the expert.

For example, in one embodiment, it may be desirable to keep APMM lean. For example, if computing resources on agent device 110 are limited, APMM 111 may be configured to collect information as described herein, perform limited processing of the collected information, and communicate the information to server 150. In such case, SPMM 151 may perform real-time (e.g., periodic) checking or monitoring of data received from APMM 111 and may determine whether or not a KPI was exceeded or breached (e.g., using data in process object 154). SPMM 151 may, upon determining that a KPI was breached, send an alert to EPMM 141 on expert device 140. EPMM 141 may alert the expert, e.g., by displaying a message on a screen of device 140. In other embodiments, processing load may be differently distributed. For example, using a process object, APMM 111 may determine that a KPI threshold was breached and may mark or record the breach in data sent to SPMM 151. SPMM 151 may identify the breach based on the mark inserted by APMM 111 and may alert EPMM 141 accordingly.

As described herein, an alert may be generated if a KPI was breached. If it was determined, e.g., following an evaluation of a progress of a process, that a KPI was not breached, then one or more actions may be performed. For example, thresholds may be modified based on the progress or statistical data may be updated etc. For example, a method performed by an embodiment of the invention may, using a processor, compare a CSR process to a performance threshold. The processor may determine whether or not a threshold was breached or exceeded by a characteristic of the process and, if determining the threshold was not breached or not exceeded, then the method may include recording information related to a progress or state of the process. Any other action may be performed upon determining a KPI or other threshold was not breached. As described herein, if the threshold was breached by a characteristic of the process, then the method may include data related to the breached threshold to a computing device and, using a processor, providing data related to the breached threshold to a computing device. The method may further include receiving, at the computing device, information related to assistance provided to the CSR.

EPMM 141 may interact with an expert, manager or any person operating device 140 to receive information such as feedback. For example, following alerting a manager that a KPI was exceeded or breached or violated and further enabling the manager to assist the CSR, EPMM 141 may present for example an electronic form for detailing the help or assistance provided to the CSR. Feedback or other information may be sent to, and stored on, a server. For example, EPMM 141 may send feedback received from an expert on device 140 to server 150. The operations of determining a KPI threshold was breached and alerting an expert may be performed in real-time. For example, SPMM 151 may examine data received from APMM 111 at a high rate (e.g., every 5 seconds). Otherwise described, SPMM 151 may examine data received from one or more APMM 111 modules at the rate such data is received.

Feedback received and used as described herein may be related to any activity of the expert or the agent. In an exemplary scenario according to the invention, upon detecting a KPI threshold (e.g., a Customer Satisfaction (CSAT) threshold) was breached (e.g., by APMM 111), a manager, expert or supervisor may be alerted to help an agent in performing a process. The time spent by the expert may be recorded and provided as feedback to server 150. For example, the time spent may be automatically inserted into a form presented to the expert when filling a feedback form. Feedback from the expert may be provided based on an evaluation of the agent. For example, the expert may select training material that may be sent to the agent based on evaluation of the agent. Accordingly, a feedback may include attached material (e.g., training material) or the feedback may include a referenced to relevant material. Feedback may be provided in real-time, e.g., a web chat session between the expert and the agent may be automatically established enabling the expert to directly, in real-time, provide feedback or guidance to the agent and/or to server 150.

Accordingly, a short duration, e.g., a few seconds, after a process in a contact center exceeds an associated threshold or a KPI is breached, an expert may be alerted. Workload may be distributed between or among modules. For example, using a process object, APMM 111 may compare or relate properties of a current process to a KPI threshold, may determine the threshold was breached but may leave alerting EPMM 141 to SPMM 151. For example, by periodically checking data received from APMM 111, SPMM 151 may determine a threshold such as a KPI threshold was breached and may alert EPMM 141.

A KPI may be related to any relevant aspect or property of a process, e.g., a duration, a customer, a CSR, a service or a product. Any KPI value, parameter or threshold may be associated with a process. For example, a KPI threshold may be related to a duration of the process, a customer related to the process and a CSR related to the process. Complex KPIs may be defined and associated with a process. For example, a KPI may define a duration or time required for performing a service request for a specific client or a specific client category. Accordingly, a KPI may include any rules or logic and a breaching of a KPI threshold may be determined based on any logic, rule or criteria. For example, a KPI threshold for a operation or process performed by first CSR may be different from the threshold for the same operation or process when performed by second CSR.

Embodiments of the invention enable automatically prompting a user to provide input or feedback related to help or assistance provided by a manager or expert to a CSR. For example, EPMM 141 may provide an electronic form on a display of expert device 140. For example, following alerting an expert of a breach of a KPI (and possibly after the expert provided help to the CSR), EPMM 141 may provide an electronic form to the expert. Some values, entries or fields in the form provided may be automatically filled or populated by EPMM 141. For example, the names of the expert and CSR, the process name, the data and time and other parameters may all be filled in the form by EPMM 141. Accordingly, the expert may only need to provide additional comments or other relevant input. Information in a form (both automatically filled by EPMM 141 and provided by the expert) may then be sent to server 150. Accordingly, various statistics may be computed or generated. For example, SPMM may find all reports from a specific expert and provide an overview of that expert's work, e.g., how many CSRs this expert helped in the past week or month, what type of processes required help, how much help was required for a specific process etc. It will be understood that by collecting and storing information related to help provided by experts as described herein, any relevant information may be provided in any form. For example, pie charts depicting the amount of KPI breaches per process, CSR, service or customer may be presented. Other forms may be used to present usage of experts' time etc.

As described herein, a method according to embodiments of the invention may include associating or connecting a task and a KPI with a process (e.g., in a process object). A process currently performed by a CSR may be identified, e.g., by identifying a task (or a sequence of tasks, or a number of tasks) performed by a CSR and further determining the task is associated with a process, e.g., based on the association of the task with a process as defined in a process object. Once a process being performed is identified, KPIs associated with the process may be known (e.g., by examining data in a process object). Accordingly, a breaching of a threshold such as a KPI threshold may be identified. For example, upon determining the process being performed, APMM 111 may examine KPI thresholds associated with the process (as defined in a process object) determine a KPI was exceeded or breached or violated.

For example, APMM 111 may identify, possibly in real-time, a process currently performed by a CSR by determining at least one task performed by the CSR is associated with a predefined process, e.g., based on definitions in a process object. For example, process object 154 may be provided to APMM 111 by SPMM 151.

Alerting an expert, in real-time, when a KPI threshold of a process is breached, may include providing the expert with information related to the currently performed process. Information provided to the expert may include data in the relevant process definition, e.g., extracted from a process object where the currently performed process is defined. For example, data related to a currently performed process may be provided by APMM 111 and may be stored on server 150, e.g., on storage 153. SPMM 151 may periodically examine the data provided by APMM 111 and may determine a threshold was breached. In addition to alerting EPMM 141, SPMM 151 may extract any information related to the process from storage 153, including information in process object 154, may process the information and may send any information to EPMM 141. For example, the history of the process may be provided, e.g., a start time, tasks already performed and the like. Other information may include information related to the relevant customer or product. Accordingly, an expert may be provided, in real-time, with information relevant to a process currently performed by a CSR, thus, when providing assistance to the CSR, the expert may be provided with any required information.

Generally, a process object may be used by APMM 111 as a configuration file that includes any data, parameter or other information required in order to perform tasks and operations performed by APMM 111 as described herein. For example, APMM 111 may identify a specific process being performed by a CSR by identifying or determining tasks performed by the CSR, and identifying the specific process by identifying a process definition in the process object that includes or matches the identified tasks. It will be understood that a single process object may include definitions of a plurality of process. Accordingly, a single process object may be used in order to identify any number of different process. Generally, identifying or determining a process currently performed by a CSR may be achieved by relating any information (e.g., obtained by APMM 111 as described herein) to a process object and determining a matching process.

According to embodiments of the invention, a method including relating a process currently performed to a KPI threshold, determining, in real-time, the KPI threshold was exceeded or breached, and, providing, in real-time, data related to the breached KPI threshold to a computing device such as a mobile device, may be based on a selectively provided process object. For example, as described herein, a process object (e.g., process object 154) may include information required in order to determine or identify an ongoing process and may further include KPI definitions, parameters and values. A process object may be selectively provided to a computing device operated by a CSR. For example, a process object may be associated with a group or category of agents. For example, when a CSR logs into agent device 110, APMM 111 may provide server 150 with an identification of the CSR. Server 150 may examine configuration data and determine that a specific process object is to be provided to APMM 111 on agent device 110, for example, based on an association of the CSR operating agent device 110 with a group or category of agents.

The provided process object may be used by APMM 111 in order to relate a process currently performed to a KPI threshold, determine, in real-time, the KPI threshold was breached and provide, in real-time, data related to the breached KPI threshold to a mobile device (e.g., to expert device 140) or to server 150. A process object based on, or according to which, APMM 111 identifies ongoing process and determines breaching of KPIs may be replaced or provided dynamically. For example, at any point in time, server 150 may push or otherwise provide a new or updated process object. APMM 111 may be configured to dynamically replace a process object used for its operation. For example, upon receiving a new or updated process object from server 150, APMM 111 may temporarily suspend its operation, load the received process object and resume operation according to the newly received and loaded process object.

For example, a process object may be provided as a dynamic-link library (DLL). Accordingly, when received from server 150, the process object, in the form of a DLL, may be loaded into a memory of agent device 110, possibly replacing a previously loaded DLL, and APMM 111 may use the freshly and dynamically loaded process object in subsequent operations. In one embodiment, a process object may be automatically downloaded from a server to a computing device upon login of the CSR to the computing device. For example, APMM 111 may automatically download process object 154 upon detecting a login of a CSR in to agent device 110.

Figure 2:
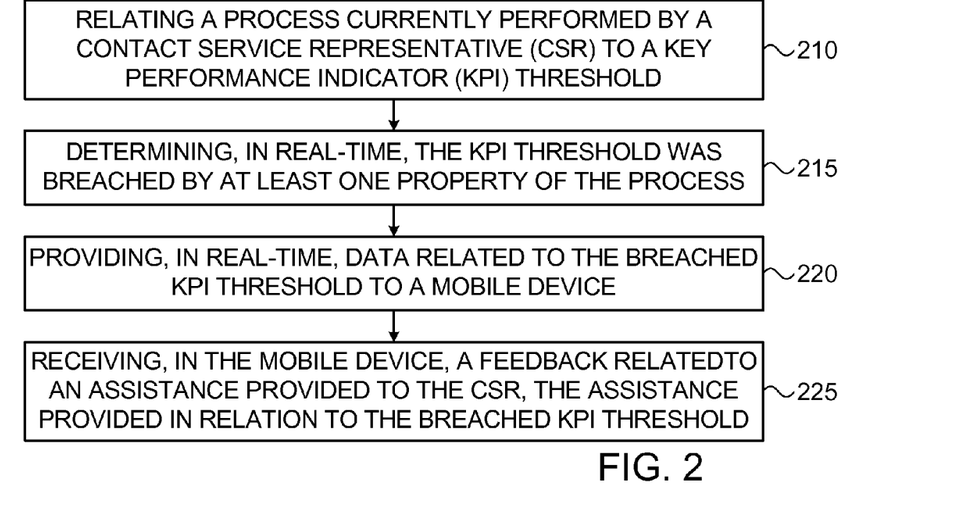
FIG. 2 is a flowchart diagram according to some embodiments of the present invention.

Reference is now made to FIG. 2 which shows a flowchart diagram of a method or flow according to some embodiments of the present invention. As shown by block 210, the method or flow may include relating a process currently performed by a (CSR) to a threshold such as a KPI threshold.

As shown by block 215, the flow may include determining, for example in real-time, a threshold such as a KPI threshold was breached or violated by at least one attribute, characteristic or property of a process. For example, APMM 111 may identify a process currently performed by a CSR operating agent device 110. Having identified the process, APMM 111 may monitor or determine a progress of the process currently performed by the CSR. Based on the progress (or any applicable characteristic, property or attribute of the process currently performed), APMM 111 may determine whether or not a threshold such as a KPI threshold was breached. Any information collected or calculated may be sent to a server. For example, APMM 111 may send, in real-time, information related to a progress of a process to server 150. APMM 111 may send to server 150, in real-time, an indication that a KPI related to a specific process was breached.

As shown by block 220, the flow may include providing, possibly in real-time, data related to the breached KPI threshold to a computing device such as a mobile device. For example, an indication that a KPI related to a process performed in association with agent device 110 may be provided, in real-time, to expert device 140. For example, server 150 may send an alert to expert device 140 upon determining a KPI was breached.

For example, SPMM 151 may store on server 150 (or storage 153), possibly in real-time, information related to a progress of a process, e.g., as such information is received from APMM 111. SPMM 151 (or another unit) may periodically examine real-time data stored on storage 153 and may thus detect that a KPI was breached. For example, SPMM 151 may detect a report of a breached KPI as received from APMM 111. In another example, SPMM 151 may process data received from APMM 111 (e.g., a duration of a process) and may determine, based on the processing, that a KPI was breached. Generally, a process object usable to determine a KPI was breached may be available to any one of SPMM 151 and APMM 111. Accordingly, determining a KPI was breached based on a process object may be performed by any one of these modules. Upon determining a KPI was breached, SPMM 151 may alert a supervisor, manager, expert, an application or any other relevant entity. For example, SPMM 151 may communicate with EPMM 141, inform EPMM 141 of the breached KPI and EPMM 141 may alert the supervisor, e.g., by means of a popup, audio alert and the like.

Sending data, alerts or other information from APMM 111 to server 150 may be based on one or more rules, criteria or configuration parameters. For example, APMM 111 may send data related to a progress of a process periodically (e.g., every two seconds or based on an expiry of a timer). In other embodiments or configurations, APMM 111 may send data related to a progress of a process based on an event, e.g., when a KPI is breached. In yet other configurations, APMM 111 may send data related to a progress of a process to server 150 upon a request to do so, e.g., from the CSR operating agent device 110.

Figure 3:
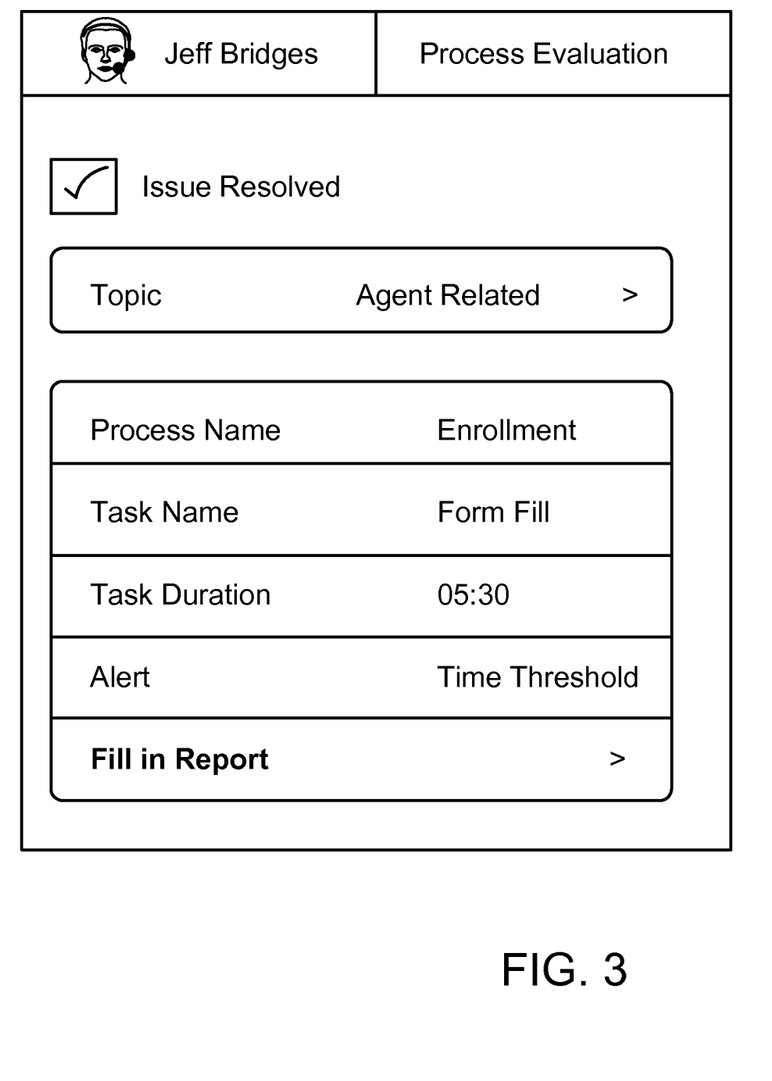
FIG. 3 shows an exemplary screenshot according to embodiments of the invention.

As shown by block 225, the method may include receiving, in or at the mobile device, information such as feedback related to assistance provided to the CSR. For example, information related to assistance provided in relation to the breached KPI threshold. In an embodiment, EPMM 141 may, based on information received from SPMM 151, present an electronic form for detailing assistance provided to the CSR. A form provided may already include information such as the name or other identification of the CSR, customer, product or process. Reference is additionally made to FIG. 3 which shows an exemplary screenshot according to embodiments of the invention, which may be displayed e.g. via a monitor such as output device 540 (FIG. 5). As shown, when presented, the form may already include values for the process name, duration and the like. For example, these values may be obtained from storage 153 where they may be stored as part of monitoring a progress of a process as described herein.

Any information related to assistance provided by an expert may be recorded. For example, after alerting an expert, EPMM 141 may monitor activity related to the alert. For example, activity of the expert in association with a breached KPI may be monitored and recorded. For example, EPMM 141 may report any activity related to an alert or process to server 150. Information related to an activity of an expert may be collected and used in order to fill at least some of the fields or entries in a feedback form provided to the expert as described herein.

Collecting and storing information related to a progress of processes may enable various features. For example, by examining the progress of a process as it is performed repeatedly (possibly by different CSRs), SPMM 151 may determine that the process definition is to be modified. For example, if it is noted that the completing the process always takes longer than defined, the definition may be changed, e.g., by setting a new duration for the process. An updated definition of a process may be used in order to update (or regenerate) a process object. An updated process object may be dynamically provided as described herein. Accordingly, a method according to embodiments of the invention may include determining a progress of a process based on a process definition, modifying the process definition and providing an updated process definition.

Based on one or more processes completed by a CSR and based on progress information associated with the processes, a training program for the CSR may be generated or modified. For example, a CSR may perform a specific process a number of times. By examining information related to the performance, SPMM 151 may detect that the same specific task (e.g., opening a new client in the system) always takes the CSR more than expected. Accordingly, SPMM 151 may select a training session, related to the specific task, for the CSR. In other embodiments, SPMM 151 may inform a supervisor of its findings, e.g., indicate to the supervisor that a specific CSR has repeated trouble with a specific tasks or process.

It will be understood that information related to a progress of a process may be collected for any number of process involving any number of CSRs. In fact, in a typical embodiment, a very large number of CSRs may be monitored as described herein, and a large number of experts may be alerted by a single system.

A graphical representation of ongoing or current process may be provided to a user, e.g. via a monitor such as output device 540 (FIG. 5). For example, based on information in storage 153, collected by a plurality of modules such as APMM 111, a graphical representation of a plurality of process may be provided. For example, an expert may be provided with a view of some or all process performed by a specific CSR or by a group of CSRs. An aggregated view related to some or all current processes may likewise be provided. For example, as described herein, progress of process in a contact center may be monitored and recorded, for example in real-time (e.g., on storage 153). Accordingly, stored information may be used in order to provide a real-time view of a progress of one or more process.

Figure 4:
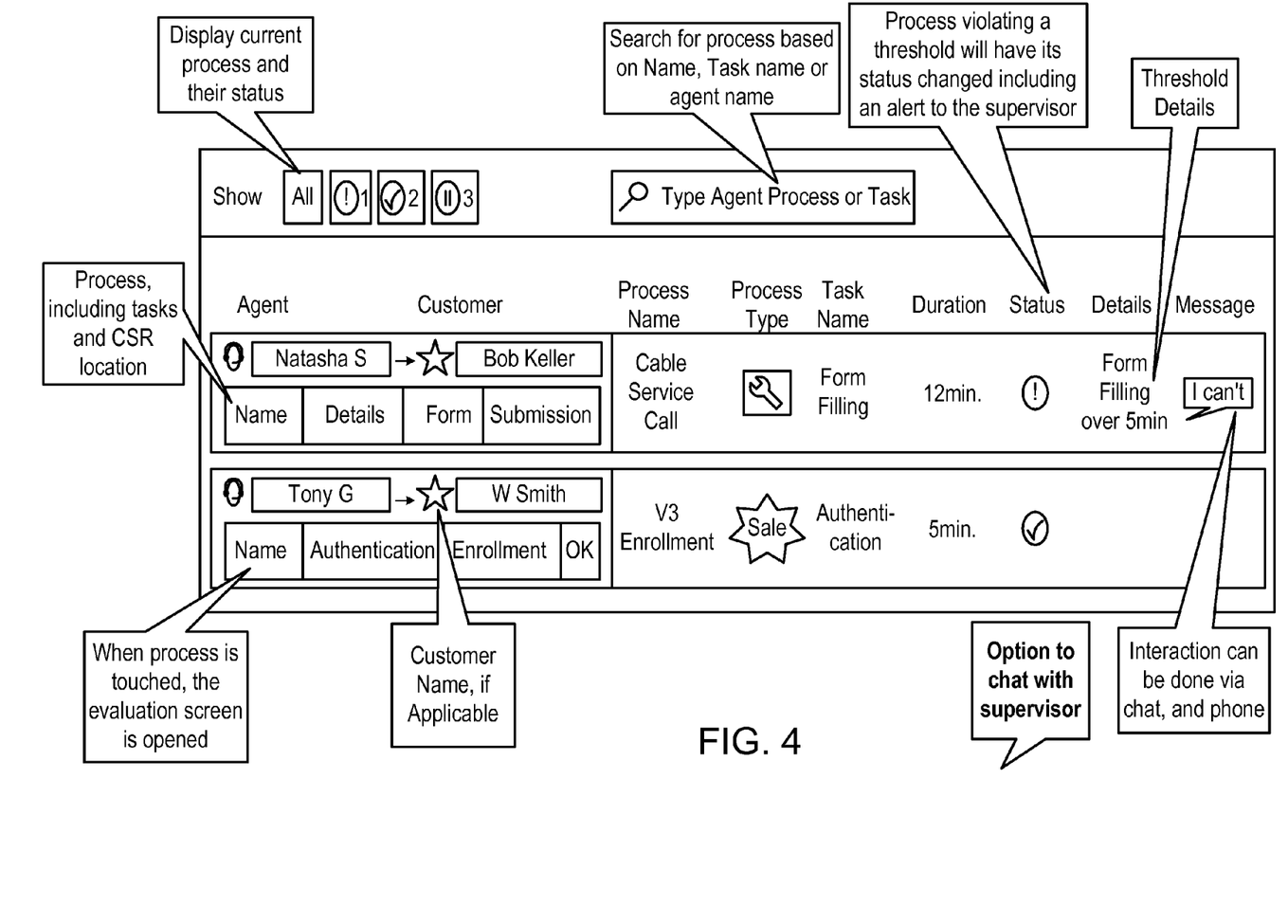
FIG. 4 shows an exemplary screenshot according to embodiments of the invention.

Reference is additionally made to FIG. 4 which shows an exemplary screenshot according to embodiments of the invention, which may be displayed e.g. via a monitor such as output device 540 (FIG. 5). As shown, a system may provide a graphical representation or view of process, including, for each process, items such as process name, thresholds such as a KPI thresholds and customer name. A view can be configured to show current process and their respective status or progress. Tasks in a specific process may be displayed including status or progress of each task. As further shown, a search box may enable searching for process, e.g., based on a CSR, customer, product and the like. A search query may be sent to a server (e.g., server 150) where information related to process may be examined in order to generate a response for the query. As shown, options for interacting with a CSR or evaluating a CSR are provided.

Reference is made to FIG. 5, showing high level block diagram of an exemplary computing device according to embodiments of the present invention. Computing device 500 may include a controller 505 that may be, for example, a central processing unit (CPU) or other processor, a chip or any suitable computing or computational device, an operating system 515, a memory 520, a storage 530, one or more input devices 535 and one or more output devices 540. Other components or arrangements may be used.

Operating system 515 may be or may include any code segment designed and/or configured to perform tasks involving coordination, scheduling, arbitration, supervising, controlling or otherwise managing operation of computing device 500, for example, scheduling execution of programs. Operating system 515 may be a commercial operating system. Memory 520 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 520 may be or may include a plurality of, possibly different memory units.

Executable code 525 may be any executable code, e.g., an application, a program, a process, task or script. Executable code 525 may be executed by controller 505 possibly under control of operating system 515. For example, executable code 525 may be an application or module that performs operations (or when executed causes controller 505 to perform) as described herein to perform methods as disclosed herein and/or to perform the functions of any one or more of APMM 111, EPMM 141 and/or SPMM 151. Where applicable, executable code 525 may carry out operations described herein in real-time. Computing device 500 and executable code 525 may be configured to update, process and/or act upon information in real-time, e.g., at the same rate the information, or a relevant event, are received. In some embodiments, more than one computing device 500 may be used. For example, a plurality of computing devices that include components similar to those included in computing device 500 may be connected to a network and used as a system. For example, agent device 110, expert device 140, customer device 160, and/or server 150 may be devices similar to device 500.

Storage 530 may be or may include, for example, a hard disk drive, a CD-Recordable (CD-R) drive, a universal serial bus (USB) device or other suitable removable and/or fixed storage unit. Content or data (e.g., process objects and information related to progress, state or status of process) may be stored in storage 530 and may be loaded from storage 530 into memory 520 where it may be processed or used by controller 505. In some embodiments, some of the components shown in FIG. 5 may be omitted. For example, memory 520 may be a non-volatile memory having the storage capacity of storage 530. Accordingly, although shown as a separate component, storage 530 may be embedded or included in memory 520.

Input devices 535 may be or may include a mouse, a keyboard, a touch screen or pad or any suitable input device. It will be recognized that any suitable number of input devices may be operatively connected to computing device 500 as shown by block 535. Output devices 540 may include one or more monitors, displays, speakers and/or any other suitable output devices. It will be recognized that any suitable number of output devices may be operatively connected to computing device 500 as shown by block 540. Any applicable input/output (I/O) devices may be connected to computing device 500 as shown by blocks 535 and 540. For example, a wired or wireless network interface card (NIC), a modem, printer or facsimile machine, a universal serial bus (USB) device or external hard drive may be included in input devices 535 and/or output devices 540.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 520, computer-executable instructions such as executable code 525 and a controller such as controller 505.

Some embodiments may be provided in a computer program product or article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention. Various embodiments have been presented. Each of these embodiments may of course include features from other embodiments presented, and embodiments not specifically described may include various features described herein.

The invention claimed is:

1. A computer-implemented method of monitoring processes performed by a contact service representative (CSR) in a call center, the method comprising:
   tracking one or more applications executed on a CSR computing device to identify a process currently performed by the CSR, wherein the process includes one or more tasks, wherein the process is associated with one or more key performance indicators (KPIs);
   relating the process currently performed by the CSR to at least one KPI threshold;
   monitoring, by a module installed on the CSR computing device, a progress of the process currently being performed by the CSR;
   determining, in real-time and based on the progress, whether or not the KPI threshold was breached;
   providing, in real-time, data related to the breached KPI threshold to an expert computing device;
   recording activity related to assistance provided in real-time by an expert to the CSR in relation to the breached KPI threshold; and
   receiving, in real-time, at the expert computing device, feedback information related to the assistance provided to the CSR in relation to the breached KPI threshold.

2. The method of claim 1, wherein the KPI is related to at least one of: a duration of the process, a customer related to the process and a CSR related to the process.

3. The method of claim 1, comprising:
   providing, by the expert computing device, an electronic form for detailing the assistance provided to the CSR; and
   communicating data included in the electronic form to a server.

4. The method of claim 1, comprising:
   associating the one or more tasks with a process object;
   wherein, identifying the process currently performed by the CSR is based on the process object.

5. The method of claim 4, wherein identifying the process currently performed by the CSR, in real-time, is performed by determining that at least one task performed by the CSR is associated with the process object.

6. The method of claim 4, comprising providing the expert computing device with information related to the process object and with information related to the process currently performed by the CSR.

7. The method of claim 1, comprising recording, in real-time, information related to an action performed by the expert in association with the process currently performed by the CSR.

8. The method of claim 4, comprising:
   storing the process object on a server;
   associating the process object with a group of agents; and
   selectively providing the process object to a computing device operated by an agent based on an association of the agent with the group of agents.

9. The method of claim 4, wherein the process object is automatically downloaded from a server to the CSR computing device upon login of the CSR to the CSR computing device.

10. The method of claim 1, comprising collecting, by the module, information related to the progress and sending the information to a server in real-time.

11. The method of claim 10, comprising sending, in real-time, an alert from the server to a mobile computing device and presenting the alert on the mobile computing device.

12. The method of claim 10, comprising modifying the process object based on the progress.

13. The method of claim 10, comprising:
   storing, in real-time, the information related to the progress on the server;
   periodically examining real-time data stored on the server;
   determining a threshold related to a process was breached; and
   alerting a supervisor, wherein alerting the supervisor comprises providing information related to the process and information related to the threshold.

14. The method of claim 1, comprising selecting a training for the CSR based on the progress.

15. The method of claim 4, comprising:
   identifying, in real-time, a plurality of current processes based on one or more process objects; and providing a manager with an aggregated view related to the current processes.

16. The method of claim 10, comprising providing a graphical representation of a plurality of processes associated with a selected agent based on data stored in the server.

17. The method of claim 1, wherein the process is related to a service provided by the CSR.

18. The method of claim 10, wherein the real-time data is sent to the server based on one of: an expiry of a timer, a breach of the KPI threshold and an input from the CSR.

19. The method of claim 10, comprising providing data from the server to a computing device operated by a supervisor based on a selection of at least one of: an agent, a process, a task and a supervisor.

20. The method of claim 1, wherein monitoring the progress of the process comprises monitoring a time spent on the process, wherein the KPI threshold is a time threshold, and wherein determining whether the KPI threshold was breached comprises comparing the time spent on the process to the time threshold.

* * * * *